(12) United States Patent
Kim et al.

(10) Patent No.: US 7,280,931 B1
(45) Date of Patent: Oct. 9, 2007

(54) METHOD AND SYSTEM FOR CALIBRATING AN ELECTRICAL DEVICE

(75) Inventors: Nathaniel W. Kim, Raleigh, NC (US); Charles S. Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/436,951

(22) Filed: May 18, 2006

(51) Int. Cl.
*G05D 3/12* (2006.01)
(52) U.S. Cl. .......................... 702/81; 700/286
(58) Field of Classification Search ................. 702/81; 700/286
See application file for complete search history.

(56) References Cited

U.S. PATENT DOCUMENTS

| | | |
|---|---|---|
| 6,321,091 B1 | 11/2001 | Holland |
| 6,360,169 B1 | 3/2002 | Dudaney |
| 6,738,712 B1 | 5/2004 | Hildebrant |
| 6,868,265 B2 | 3/2005 | Zodnik |
| 2002/0154000 A1 | 10/2002 | Kline |
| 2003/0050737 A1 | 3/2003 | Osann, Jr. |
| 2003/0217151 A1 | 11/2003 | Roese et al. |
| 2003/0229423 A1* | 12/2003 | Andarawis et al. ......... 700/286 |
| 2005/0007252 A1 | 1/2005 | Ameson et al. |
| 2005/0026596 A1 | 2/2005 | Markovitz |

OTHER PUBLICATIONS

Patwardhan et al., INSPEC , "Enforcing Policies in Pervasive Environments", Proceedings of MOBIQUITOUS 2004.
Ratsimor et al., "Agents2Go: An Infrastructure for Location-Dependent Service Discovery In The Mobile Electronic Commerce Environment", 2001.
Varshney, "Location Management for Mobile Commerce Applications in Wireless Internet Environment", ACM Transactions on Internet Technology, vol. 3, No. 3, Aug. 2003, pp. 236-255.
Steven et al., "A Composable Framework for Secure Multi-Modal Access to Internet Services From Post-PC Devices", Mobile Networks and Applications 7, pp. 389-406, 2002.
Xelerated, "Xelerated and IP Infusion Demonstrate IP Routing Solution", http://www.xelerated.com/templates/page.aspx?page_id=237, Copyright © 2001-2005 Xelerated.
Ipinfusion™XELERATED, "Xelerated and IP Infusion Reference System", www.xelerated.com, www.ipinfusion.com.

\* cited by examiner

*Primary Examiner*—Bryan Bui
*Assistant Examiner*—Sujoy Kundu
(74) *Attorney, Agent, or Firm*—Arthur J. Samodovitz; Hoffman, Warnick & D'Alessandro

(57) ABSTRACT

In general, the present invention provides a method and system for calibrating an electrical device that utilizes a data networking protocol (e.g., 802.1X) over a power delivery network. Specifically, the present invention leverages information gathered and stored during the authentication and operation of the electrical device to determine whether the electrical device should be calibrated. In general, the present invention makes this determination based on time elapsed since a previous calibration and/or cumulative usage of the device.

17 Claims, 11 Drawing Sheets

METHOD AND SYSTEM FOR CALIBRATING AN ELECTRICAL DEVICE

CROSS-REFERENCE TO RELATED APPLICATIONS

This application is related in some aspects to the commonly assigned and co-pending application identified by assigned U.S. application Ser. No. 11/436,237, entitled "Method and System for Managing an Electrical Device Over a Power Delivery Network", and filed May 18, 2006, the entire contents of which are herein incorporated by reference. This application is also related in some aspects to the commonly assigned and co-pending application identified by assigned U.S. application Ser. No. 11/436,351, entitled "System and Method for Disabling an Electrical Device", and filed May 18, 2006 the entire contents of which are herein incorporated by reference.

BACKGROUND OF THE INVENTION

1. Field of the Invention

The present invention generally provides a method and system for calibrating an electrical device. Specifically, the present invention provides various approaches for determining when the electrical device should be calibrated.

2. Related Art

Within organizations, there exists a need to identify and track the calibration of re-locatable assets/electrical devices (e.g., medical equipment, computers, printers, photocopiers, etc.) that draw energy from the organization's power delivery network. From time-to-time, physical actions are needed to locate an electrical device, determine if the device is in need of calibration and to undertake the calibration. This is time consuming and expensive. In some cases, the electrical device may be calibrated prior to the time it is needed, because it is not possible to know how long the device has been in use. As such, the frequency of calibration is set to the worse case condition, yielding a calibration activity that is not required.

Unfortunately, no existing approach provides a cohesive solution for device calibration management. That is, existing approaches require a litany of manual efforts that consume time and resources. In view of the foregoing, there exists a need to overcome the above-cited deficiencies in the prior art.

SUMMARY OF THE INVENTION

In general, the present invention provides a method and system for calibrating an electrical device that utilizes a data networking protocol (e.g., 802.1X) over a power delivery network. Specifically, the present invention leverages information gathered and stored during the authentication and operation of the electrical device to determine whether and when the electrical device should be calibrated. In general, the present invention makes this determination based on time elapsed since a previous calibration and/or cumulative usage of the device.

A first aspect of the present invention provides a method and system for calibrating an electrical device. Specifically, information for the electrical device is provided to/on a server. The information not only can include the identity and location of the electrical device, but it also can include other details such as the time the device was engaged/enabled (powered-up), the time the device was disengaged/disabled, times/dates of previous calibrations, etc. To this extent, at least a portion of the information is provided to the server over a power delivery network. In any event, the information can be stored in a database. Based on the information, it will be determined on the server whether the electrical device should be calibrated. In one embodiment, the electrical device should be calibrated if a predetermined amount of time has elapsed since a previous calibration. In another embodiment, the electrical device should be calibrated if a cumulative usage exceeds a predetermined threshold of cumulative usage (e.g., whichever occurs first). In these embodiments, the determination action of when and where to perform the calibration action is remote from the device itself.

Similar to the above-incorporated patent applications, the teachings of the present invention can be implemented as hardware, software or a combination of hardware and software. For example, any or all of the components of the present invention could be implemented as program code of a program product that is stored on a computer useable medium.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE DRAWINGS

The invention applies to electrical devices that are connected to a power delivery network, such as an AC power delivery system, found in virtually all buildings. This invention enhances the power delivery network to dynamically identify an electrical device that is "plugged" into a power socket, identify the location of the electrical device and optionally control the application of power to the electrical device at the power socket. The invention further allows information gathered during these processes to be leveraged to make calibration decisions for the electrical device.

Figure 1:
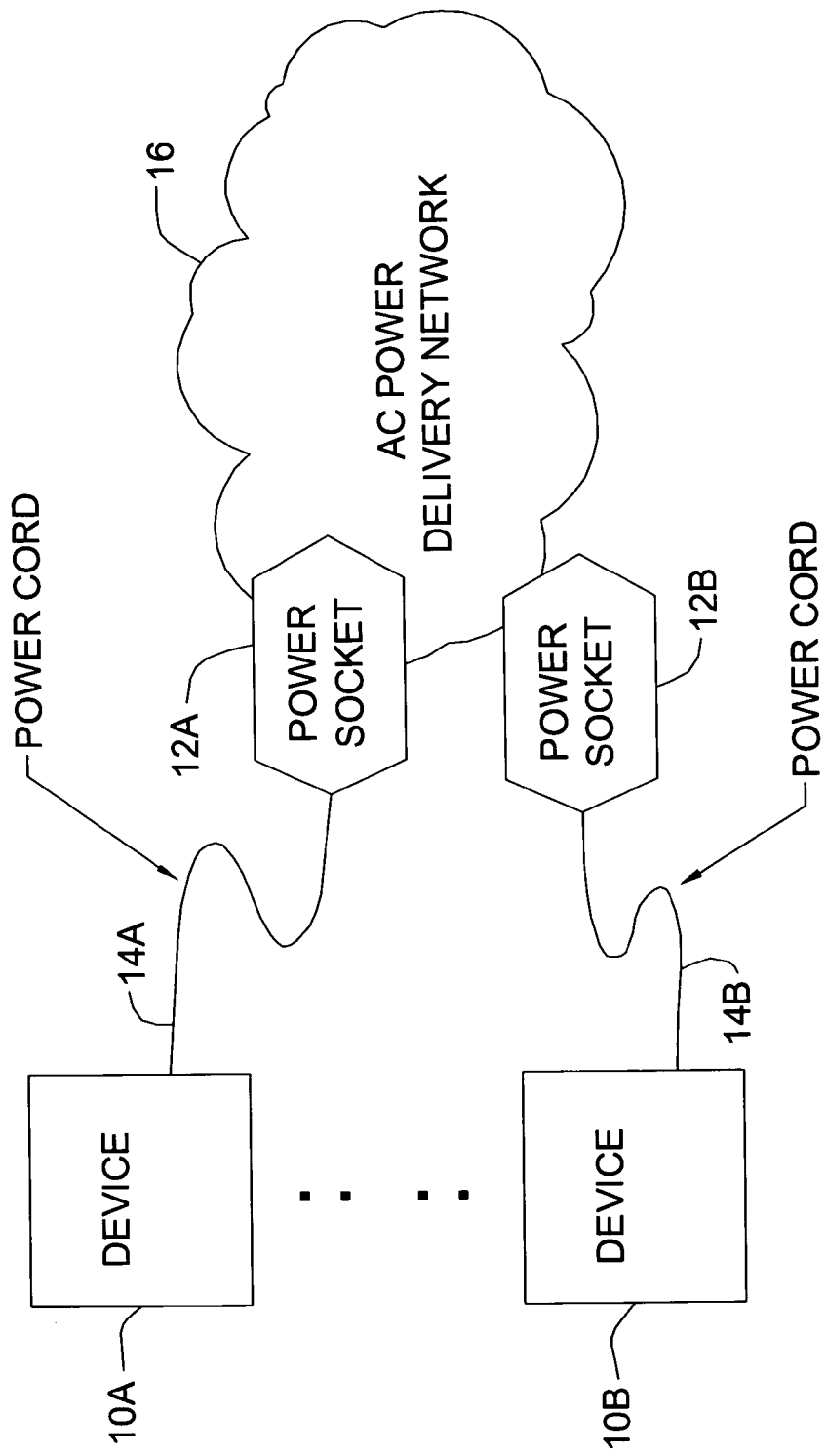
FIG. 1 depicts electrical devices connected to a power delivery network according to the prior art.

Referring now to FIG. 1, the connection of electrical devices 10A-B to a power delivery network 16 according to the prior art is shown. As depicted, electrical devices 10A-B connect to power delivery network 16 through power sockets 12A-B and power cords 14A-B. As will be further described below, the present invention will apply a data networking protocol to power delivery network 16 to provide calibration management of electrical devices 10A-B.

Figure 2:
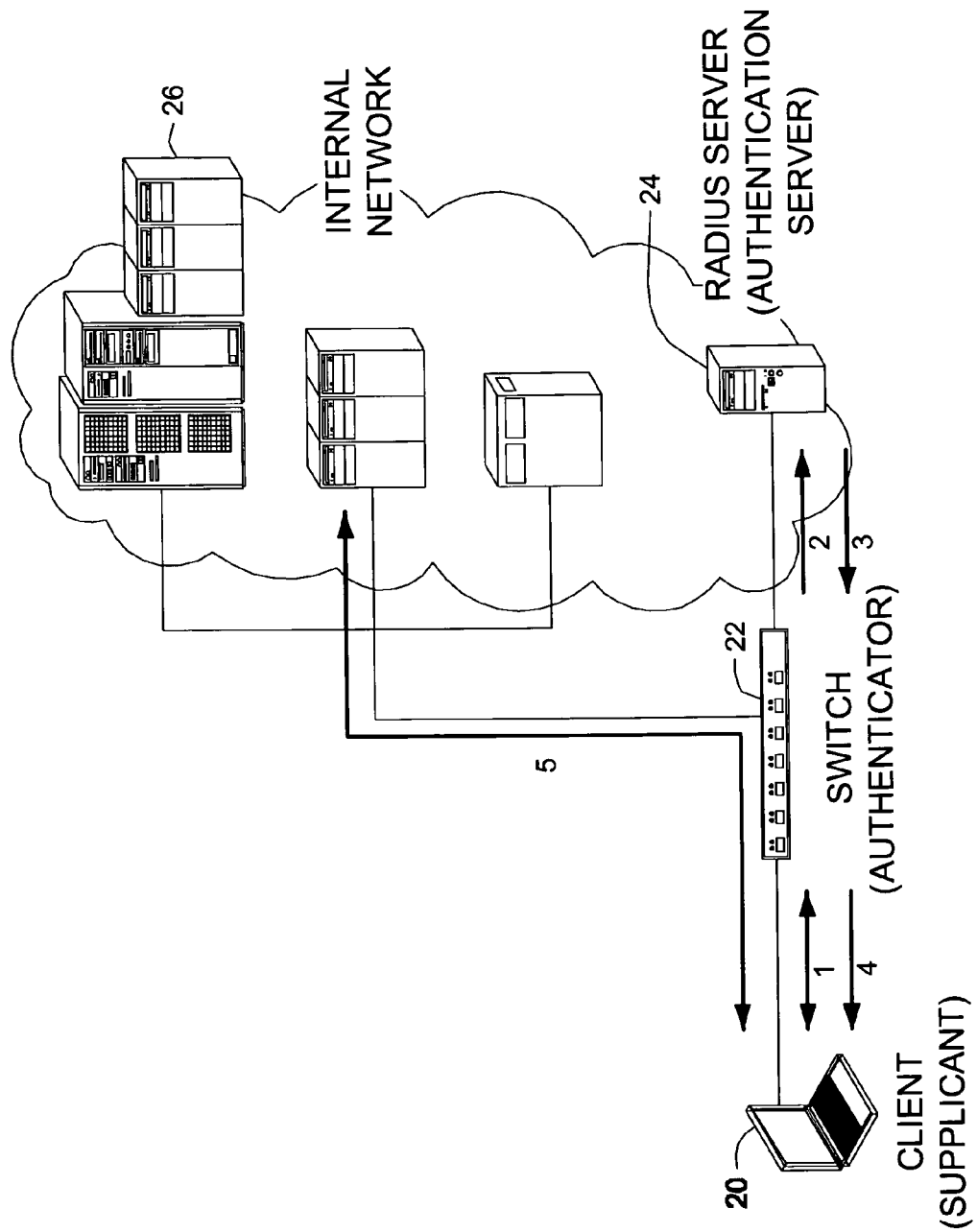
FIG. 2 depicts 802.1X port-based authentication according to the prior art.

In a typical embodiment, the data networking protocol that is applied to power delivery network 16 is 802.1X, which is also known as port-based network access control. This networking protocol is currently an I.E.E.E. standard for identification and authentication of a device at an authentication (function) component that is typically a switch port. Referring to FIG. 2, an implementation of 802.1X for authenticating a client device 20 (also referred to in the art as "supplicant") is shown. Specifically, in a Local Area Network (LAN) where 802.1X is enabled, the switch 22 challenges client device 20 for its identity to validate that it (or its user) is authorized to access data network 26. Switch 22 then sends the supplied information to an authentication server 24, which is typically a Remote Authentication Dial-In User Service (RADIUS) server, for actual authentication of the client device 20. The authentication server 24 responds to switch 22 with a response. If client device 20 is an authorized user, the switch puts the client's port in authenticated and forwarding state. Switch 22 then relays the authentication result to client device 20. Once client device 20 is authenticated and the port is in authorized state, client device 20 can access network 26 resources. If the authentication is not successful, switch 22 keeps the port closed and no network traffic will pass through.

Illustrative Embodiment

Figure 3A:
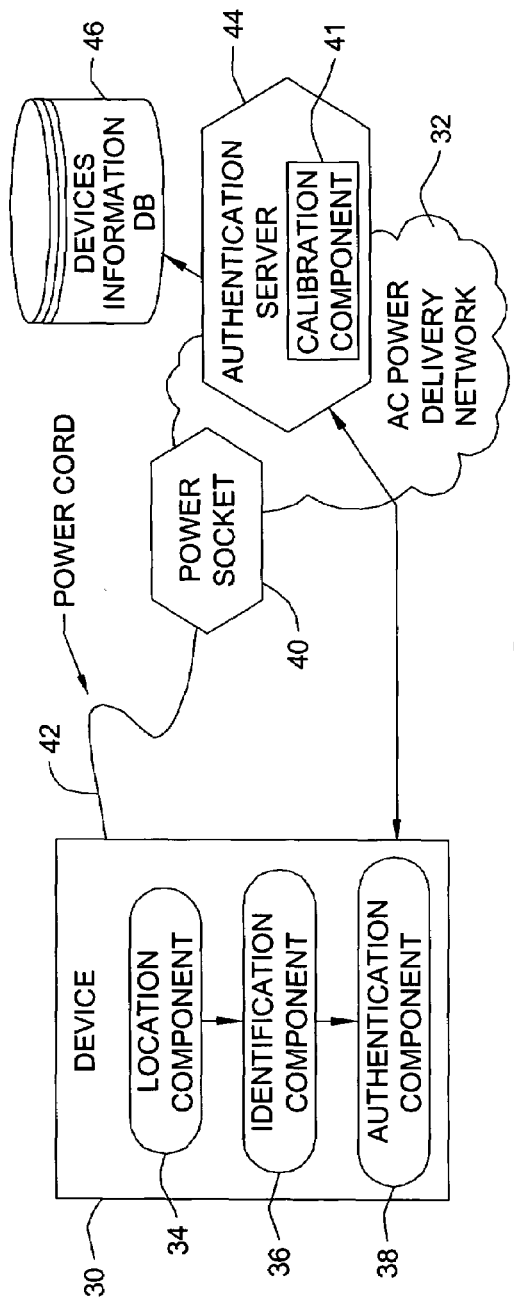
FIG. 3A depicts the management of an electrical device over a power delivery network according to one embodiment of the present invention.

Referring to FIG. 3A, one embodiment for managing an electrical device 30 over (AC) power delivery network 32 is shown. It should be understood that this embodiment is being shown for illustrative purposes only and to provide a perspective for the calibration aspects of the present invention. To this extent, the teachings of the present invention are not limited to the embodiment shown in the Figs. For example, the calibration determinations of the present invention could be implemented in conjunction with any of the embodiments in either of the above-incorporated applications. It also should be understood that electrical device 30 could be any type of electrical device now known or later developed. Examples include non-data processing devices such as printers, medical equipment, etc., and data processing devices such as computers. In any event, the embodiment shown in FIG. 3A requires no modification to power delivery network 32, specifically in power socket 40. That is, the underlying functions or components are implemented within electrical device 30.

In any event, as shown, electrical device 30 connects to power delivery network 32 through power socket 40 via power cord 42. The functions of each of the features shown in FIG. 3A will be set forth below:

(Optional) Location component/function 34—identifies the location of electrical device 30. To this extent, location component 34 can include a Global Positioning System (GPS) unit, or incorporate triangulation methods based on known radio locations of electrical device 30. Alternatively, location component 34 could be a manual input device such as a key pad, switch, etc. That is, a user could input the location (e.g., office "Y") into a keypad or the like on electrical device 30.

Identification component/function 36 (also referred to in the art as "supplicant function")—Preferably, this is the 802.1X standard supplicant that provides identity of electrical device 30 to the authentication component 38, per the 802.1X protocols. Under the present invention, identification component 36 identifies electrical device 30, and provides its location as provided by location component 34, to authentication component 38. It should be understood, however, that a standard other than 802.1X could be utilized for identification component 36.

Power socket 40—in this embodiment, this a standard power socket that allows connection of power cord 42 into power delivery network 32. In another embodiment, power socket 40 is built with a power switch that can be "shut off" by the authentication component 38 if electrical device 30 fails identification and authentication.

Authentication component/function 38—Preferably, this is the 802.1X standard authentication function that forwards the electrical device 30's identity, credentials and access request to an authentication server 44, and then acts on the commands from authentication server 44. In the embodiment of FIG. 3A, the command from authentication server 44 would cause electrical device 30 to connect to power delivery network 32. In the other embodiment to be discussed below, the authentication result could cause power bar 45 (FIG. 7) to "shut off" its power switch if the authentication fails. In this other embodiment, with successful identification and authentication of power bar 45, power bar 45 would continue to supply power to electrical device 30. It should be understood, however, that a standard other than 802.1X could be utilized for authentication component 38.

Authentication server 44—Preferably, this is the 802.1X standard authentication server that, given the identity (and optionally credentials), which represent electrical device 30's request for power, determines if the device 30 should become energized. This decision is sent to the authentication component 38 for action. It should be understood, however, that a standard other than 802.1X could be utilized for authentication server 44.

Calibration component 41—this is the function that makes the calibration determinations of the present invention. These determinations are typically made based on elapsed time since the previous/last calibration, and/or cumulative usage of electrical device 30.

(AC) Power delivery network 32—this represents an AC power system (e.g., in a building) that distributes power. Access into this system is typically via 120 volt AC sockets.

Devices information DB 46—the database function that contains the result of the authentication server 44's process and the association of electrical device 30 with other information. This will generally yield a database with fields such as Device_ID, Device's_Power_Socket_Location, Time_

Device_was_energized, Time_Device_was_de-energized, Device's_Power_Consumption, Device_Power_Priority, etc.

Figure 3B:
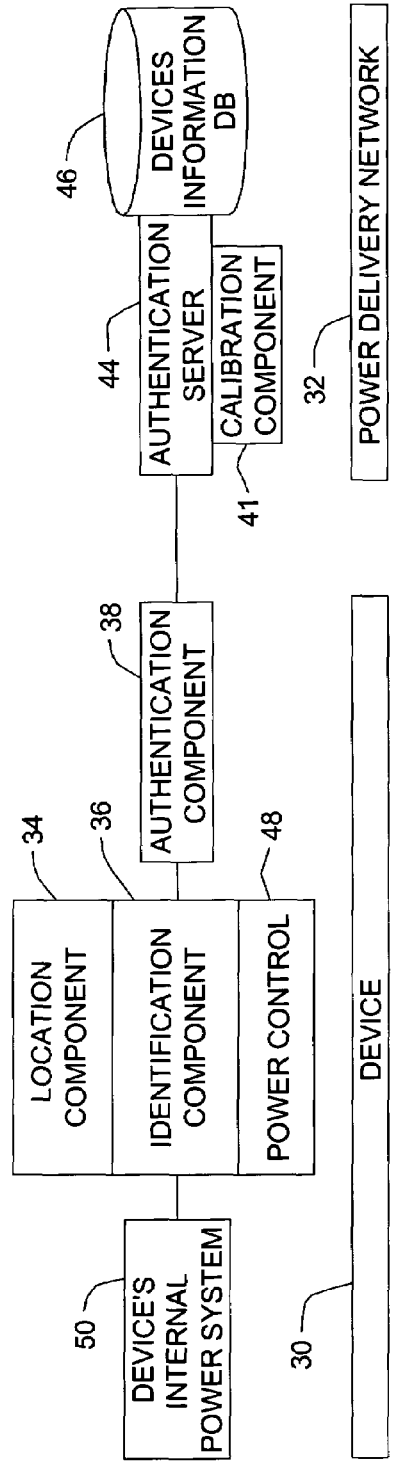
FIG. 3B depicts physical and logical views of the embodiment of FIG. 3A.

Referring to FIG. 3B, physical and logical views of the embodiment of FIG. 3A are shown. Specifically, as shown, electrical device 30 includes location component 34, identification component 36, authentication component 38, power control 48, and internal power system 50. Power delivery network 32 incorporates authentication server 44 (which contains calibration component 41) and devices information database 46 (and the power socket although not shown in FIG. 3B).

Figure 4:
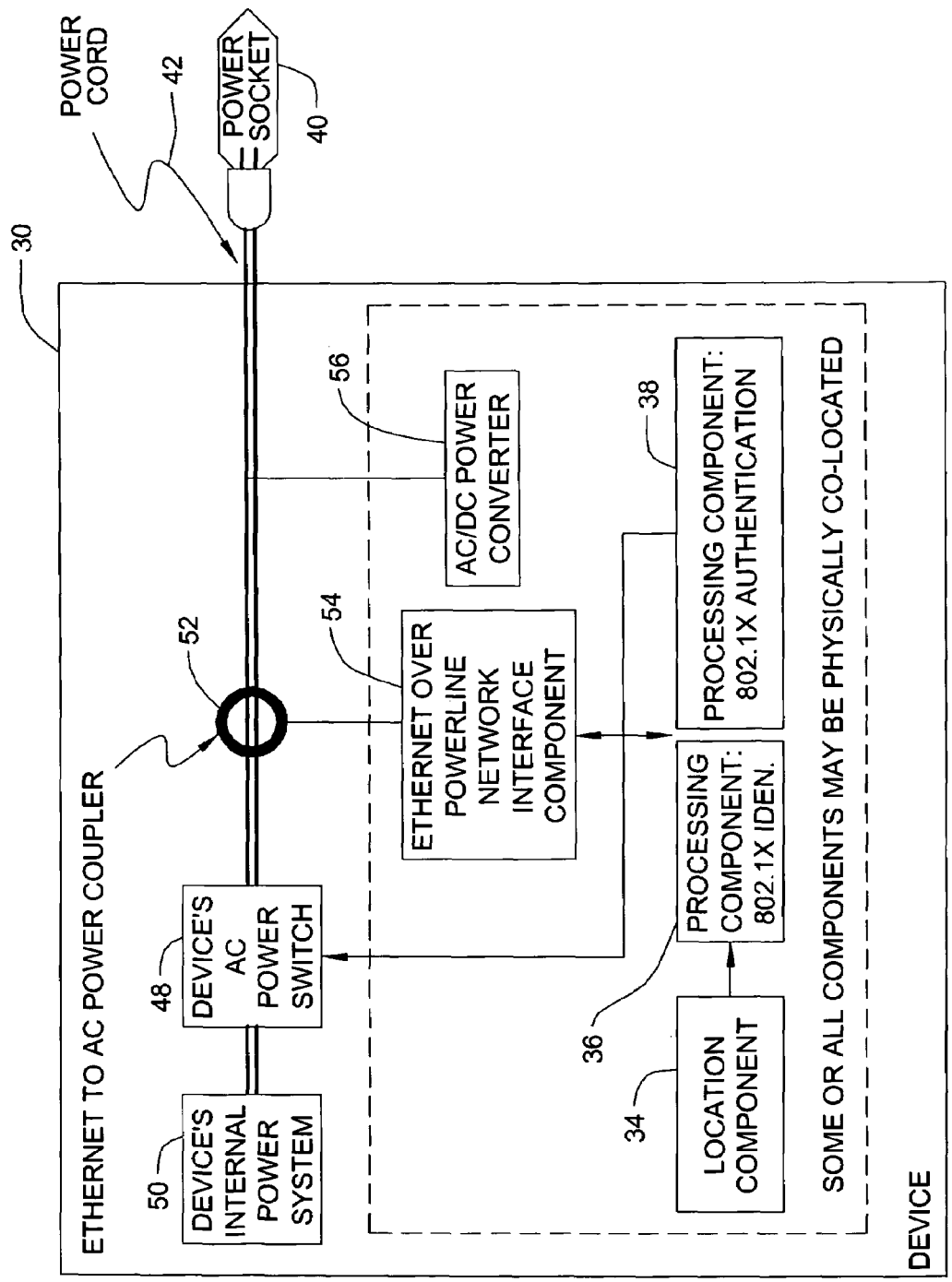
FIG. 4 depicts a diagram of an electrical device according to the embodiment of FIGS. 3A-B.

FIG. 4 depicts a more detailed diagram of electrical device 30 according to the embodiment of FIGS. 3A-B. As shown, electrical device 30 includes (optional) location component 34, identification component 36, authentication component 38, power control (AC power switch) 48, internal power system 50, Ethernet to AC power coupler 52, Ethernet over power line network interface component 54, and AC/DC power converter 56. The features of electrical device 30 are defined as follows:

Internal power system 50—the power supply and distribution system within the device.

Power control 48—The component, which under control of the 802.1X supplicant/device 30, connects the AC power from the power cord 42 to the device's internal power system 50. Multiple different physical components could be used (e.g., FETs, relays, digital or analog control signals to the device's AC/DC power supply, etc.). It should be noted that this component's power-up state can disallow power flow from the power cord 42 to internal power system 50. The processing components must command the component to allow power to flow.

Ethernet over power line network interface component 54 and the Ethernet to AC Power Converter (not shown)—these features allow standard Ethernet protocol to flow over a power line.

AC/DC power converter 56—this component provides power to electrical device 30 and is energized immediately when the power cord 42 is connected to the power socket 40.

(Optional) Location component/function 34—as indicated above, this component provides the location of electrical device 30 (e.g., physical location such as office "Y") to identification component 36 (e.g., in response to a query received by identification component 36 from authentication component 38).

Identification component 36—provides the identity of electrical device 30 (e.g., printer XYZ), as well as the location thereof as received from location component 34 for electrical device 30, to authentication component 38 (e.g., in response to a query received by identification component 36 from authentication component 38).

Authentication component 38—provides the identity and the location to the authentication server, and receives the command to energize the electrical device 30. This component controls electrical device 30's power control 48.

It should be noted that some or all of the components be combined into the same physical hardware. For example, identification component 36 and authentication component 38 could co-exist on the same physical processor. In addition, the authentication server is not shown, but should be understood to be attached to the power delivery network via an Ethernet over Power line connection. The authentication server then communicates with the authentication component 38 using IP protocols and 802.1X protocols.

Figure 5:
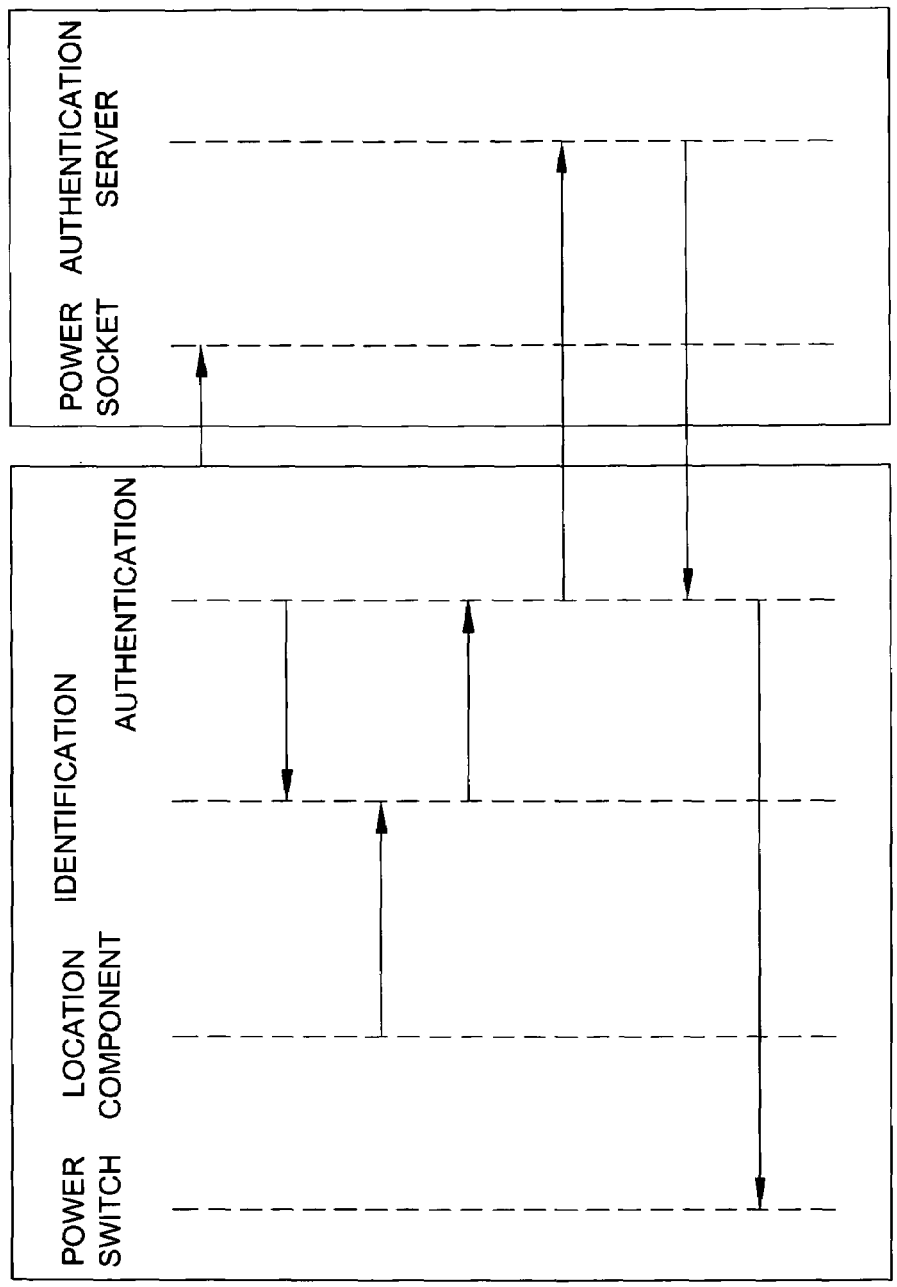
FIG. 5 depicts an operation flow diagram of the embodiment of FIGS. 3A-B and 4.

Referring to FIG. 5, an operation flow diagram of the embodiment of FIGS. 3A-B and 4 is shown and will be described in detail. Specifically, under this embodiment, the power cord for the electrical device will be connected to a power socket. Then, the authentication component will challenge the identification component to authenticate the device. This can typically occur via a query generated by and sent from the authentication component to the identification component. In response to the query, at least one attribute of the electrical device will be provided to the authentication component and then to the authentication server. Specifically, the optional location component can provide the location of the electrical device (e.g., a first attribute of the electrical device) to the identification component. In addition, the identification component will provide the identity of the electrical device (e.g., a second attribute of the electrical device) to the authentication component along with the location if received.

In any event, the authentication component will then provide this information to the authentication server, which will attempt to authenticate the device. To this extent, authentication (and subsequent activation) of the electrical device can be based on the identity of electrical device as well its physical location. This allows the power to the device to be managed/controlled based on any number of considerations such as the device's relative importance, power availability, the device's location (e.g., anti-theft), the device's previous workload, the device's calibration status, etc.

Regardless, upon successful authentication of the electrical device, the authentication component will command the power switch for the electrical device to be turned on, thus activating the electrical device. While the electrical device is powered on, the authentication component can be implemented either to re-challenge or re-authenticate the electrical device, or to send the electrical device's credentials to the authentication server, all on a regular basis, for instance every 30 seconds or a minute. Re-authenticating the electrical device at regular time intervals can be used to provide accounting information to the authentication server in a typical 802.1X implementation. The authentication server can use the authentication record and/or electrical device's credentials to keep track of how long the device has been in use or on power-on state. When the power cord is removed, the power switch inside the electrical device will be deactivated. Although not shown in FIG. 5, the authentication server will also store the results of the authentication process in the devices information database. It can further associate the electrical device with other information and create corresponding fields in the devices information database.

Figure 6:
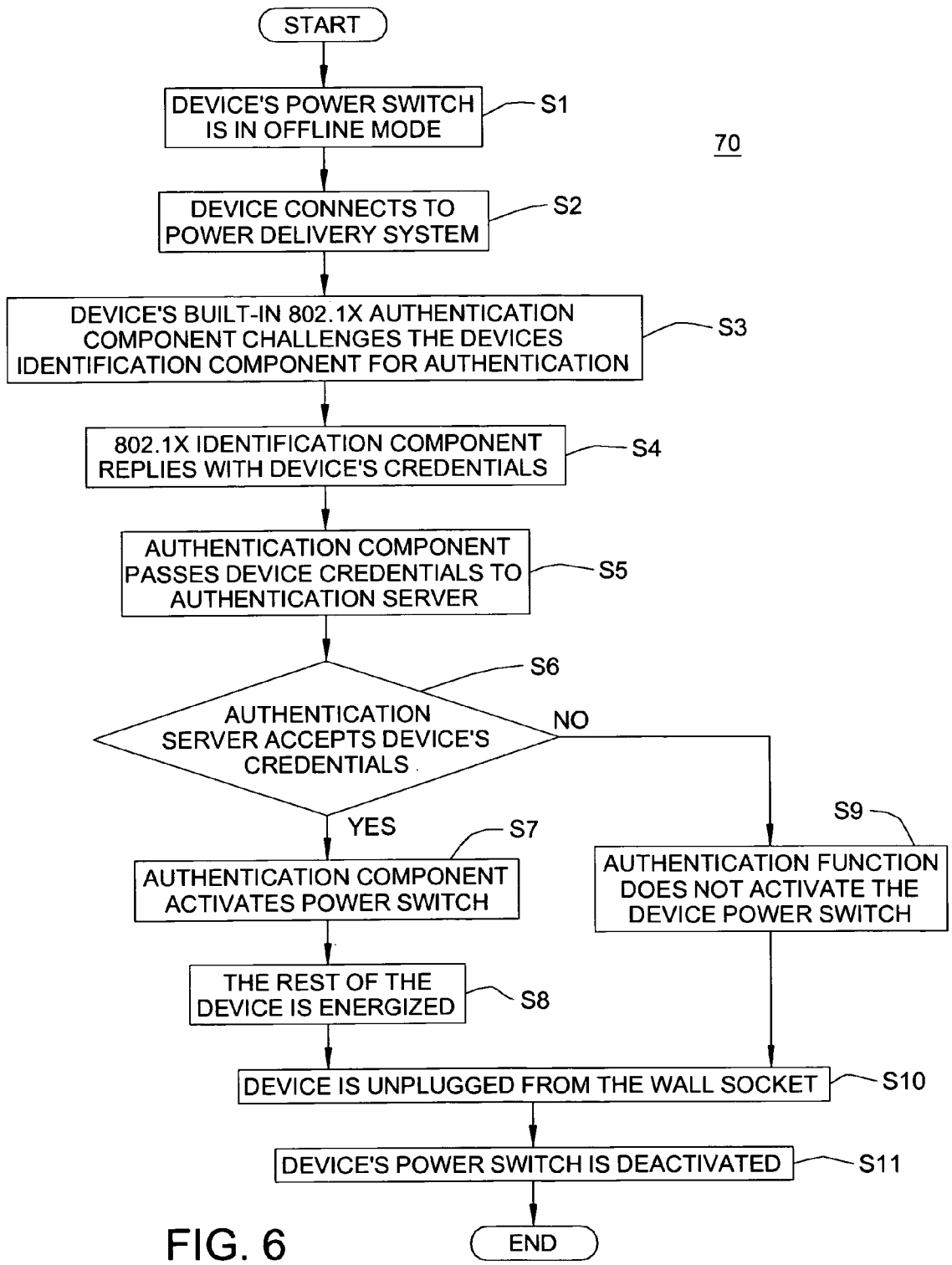
FIG. 6 depicts a method flow diagram according to the embodiment of FIGS. 3A-B and 4.

FIG. 6 depicts a method flow diagram 70 according to the embodiment of FIGS. 3A-B and 4. As depicted, in step S1, the electrical device's power switch is in "offline" mode. In step S2, the electrical device connects to the power delivery system. In step S3, the authentication component within the electrical device challenges (e.g., queries) the identification component for authentication. In step S4, the electrical device's identification component replies to the authentication component with at least one attribute (e.g., credential) of the electrical device. Under the present invention, the attribute(s) not only can include the identity, but also the location of the electrical device. Moreover, the attribute(s) could also include authentication credentials for the electrical device. Although not shown in FIG. 6, the location (if used) will initially be passed to the identification component from the location component located/contained within the electrical device. In any event, in step S5, the authentication component will pass the information to the authentication server. In step S6, it is determined whether the authentication server accepts the electrical device's credentials. If so, the authentication component will activate the electrical device's power switch in step S7, and the electrical device is energized in step S8. However, if the authentication component does not accept the electrical device's credentials, the authentication component will not activate the electrical device, as shown in step S9. In any event, when the electrical is unplugged from the wall socket in step S10, its power switch will be deactivated as shown in step S11.

Figure 7:
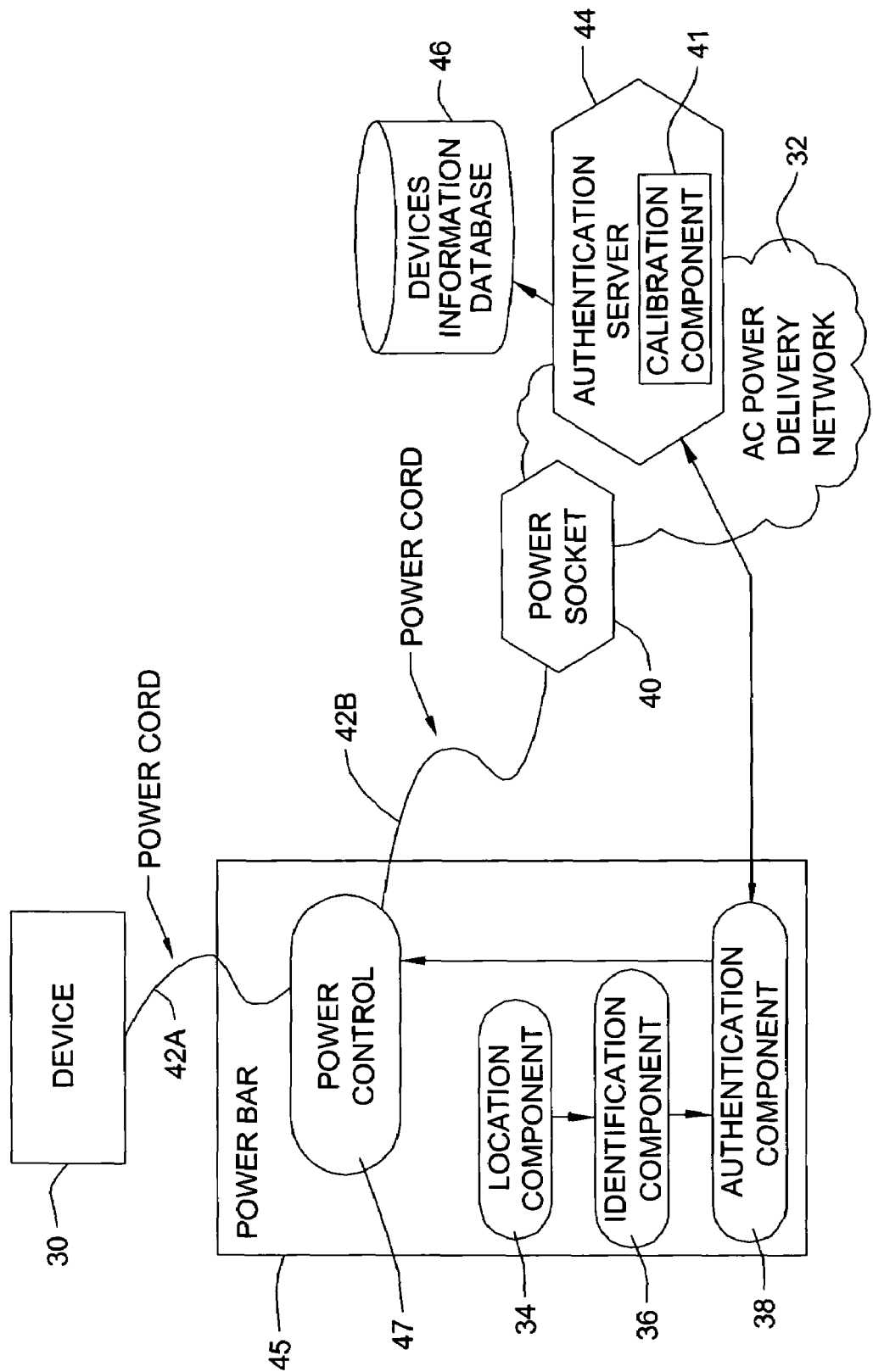
FIG. 7 depicts the management of an electrical device over a power delivery network according to one embodiment of the present invention.

As indicated above, the present invention is not limited to the implementation shown in FIGS. 3A-6. For example, the present invention could be implemented with either of the "power bar" embodiments/implementations described in the above-incorporated patent application entitled "System and Method for Disabling an Electrical Device". Referring to FIG. 7, one such embodiment is shown. All of the features of FIG. 7 will not be described herein, but as can be seen, electrical device 30 connects to power socket 40 via power bar 45. As can be further seen, authentication server includes calibration component 41.

Regardless of the embodiment implemented, the present invention results in (among other things) a standard-based database of information about the electrical device(s) that is attached to the power network. Specifically, devices information database 46, is typically accessible to authentication server 44, and contains records, which link the identity of an electrical device with its location and its characteristics. This information enables multiple services to be created that use this information. Shown below is an illustration of devices information database 46:

scribed embodiment, at least a portion of this information (e.g., device identity, location, etc.) will be provided to authentication server 44 over power delivery network 32. Information provided to authentication server 44 will be stored in devices information database 46 as shown above. Under the present invention, calibration component 41 will leverage this information to determine whether electrical device 30 should be calibrated.

Under the present invention, the decision of whether to calibrate electrical device 30 can be based upon elapsed time since a previous calibration and/or usage of electrical device 30. This decision can be made remotely for electrical device 30. With respect to time-based calibration of electrical device 30, under previous approaches, if after some fixed period of time a calibration action was desired to be performed on a specific device, a physical investigation (e.g., a "walk of the floor") was required to locate the device. This required close physical examinations, such as moving equipment to look at serial numbers located on a plate, or some other inconvenient or time consuming activity. The present invention obviates these requirements by indicating the exact location of the equipment, thus, eliminating the search activity With request to usage-based calibration of electrical device 30, previous approaches, if calibration was desired based on cumulative time a piece of equipment has been energized, the equipment must be located and an energized indicator (located on the equipment) examined to determine if the amount of usage is sufficient to require calibration. Similar to the time-based calibration approach discussed

| Device_ID | Device's_Power_ Socket_Location | Time_Device_ was_energized | Time_Device_ was_de-energized | Device's_Power_ Consumption | Device_Power_ Priority | Etc. |
|---|---|---|---|---|---|---|
| 1297 A098CB | P1A-5-1-F317/002/RTP | 07:42:15 - Feb. 22, 2005 | 16:04:02 - Feb. 22, 2005 | 0.4 | 2 | Other |
| 8391032 WW97 | P3B-8-2-FF004/660/RTP | 09:14:10 - Feb. 22, 2005 | 17:13:05 - Feb. 22, 2005 | 0.5 | 3 | Other |
| Printer-04 | P94-5-1-GG000/660/RTP | 09:42:10 - Aug. 05, 2004 | -Still on- | 1.8 | 1 | Other |

Shown below is another illustration of devices information database 46 under a power bar implementation set forth in the above-incorporated application entitled "System and Method for Disabling an Electrical Device" and shown in FIG. 7.

above, this physical investigation task (e.g., a "walk of the floor") of locating the equipment is time consuming in addition to the physical task of observing the energized indicator. Alternatively, an estimate of the usage could be made based on typical average time that the equipment is

| Device_ID | Power Bar ID | Power Bar Socket Number | Power-Bar Location | Power-Bar's_ Power_Socket_ Location | Time_Device_ was_energized | Time_Device_ was_de-energized | Device's_Power_ Consumption | Device_ Power_ Priority |
|---|---|---|---|---|---|---|---|---|
| 1297A098 CB | PB-1289401 | 1 | F1-1345/ RTP | P1A-5-1-DD006/ 660/RTP | 07:42:15 - Feb. 22, 2005 | 16:04:02 - Feb. 22, 2005 | 0.4 | 2 |
| 8391032 WW97 | PB-4892004 | 5 | F4-4200/ RTP | P3B-8-2-FF004/ 660/RTP | 09:14:10 - Feb. 22, 2005 | 17:13:05 - Feb. 22, 2005 | 0.5 | 3 |
| Printer-04 | PG-3897209 | 2 | F3-1202/ RTP | P94-5-1-GG000/ 660/RTP | 09:42:10 - Aug. 5, 2004 | -Still on- | 1.8 | 1 |

Some or all of this information can be gathered during the authentication, enabling and/or disabling of electrical device 30. Still yet, some of this information (e.g., device power priority) can be provided before or after these operations. In addition, as mentioned in conjunction with the above-deenergized. This can result in calibration before it is needed or after it is needed. In the former case, the result creates an unnecessary expense. In the later case, some safety or operational issue could arise because the equipment was operated beyond its calibration period. This present invention avoids such drawbacks by indicating the exact amount of time that electrical device 30 has been energized. This information, coupled with the physical location of electrical device 30, conserves resources by enabling calibration based on usage to be done only when needed.

It is noted that duration of energization can be a proxy for other usage measurements such as an amount of time a device was operating without respect to being in a "standby" mode. Since the information with respect to the usage of electrical device 30 is known remotely from the electrical device 30, decisions and actions by the calibration component 41 can be made remote from the electrical device 30.

It is noted that the system described does not require that the power supplied to electrical device 30 to be controlled by the system. Rather, the system can be configured to only collect information with respect to electrical device 30 and not control the power supplied thereto. In this way, the system can act as a repository of information with respect to the electrical device, facilitating the calibration activities.

Figure 8:
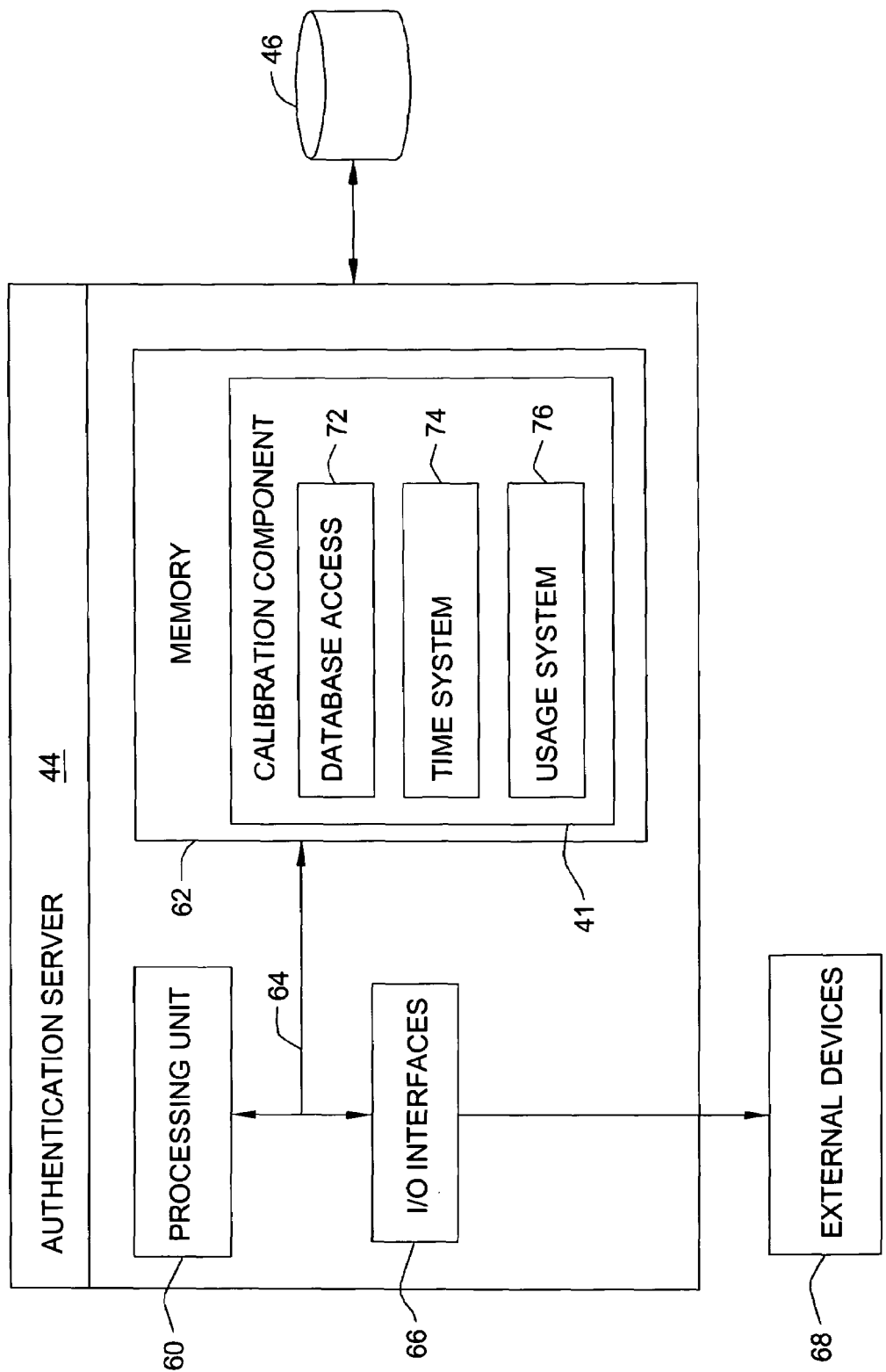
FIG. 8 depicts a more specific view of an authentication server according to the present invention.

Referring now to FIG. 8, a more detailed diagram of authentication server 44 is shown. As depicted, authentication server 44 generally includes processing unit 60, memory 62, bus 64, input/output (I/O) interfaces 66, and external devices/resources 68. Processing unit 60 may comprise a single processing unit, or be distributed across one or more processing units in one or more locations, e.g., on a client and server. Memory 62 may comprise any known type of data storage and/or transmission media, including magnetic media, optical media, random access memory (RAM), read-only memory (ROM), a data cache, a data object, etc. Moreover, similar to processing unit 60, memory 62 may reside at a single physical location, comprising one or more types of data storage, or be distributed across a plurality of physical systems in various forms.

I/O interfaces 66 may comprise any system for exchanging information to/from an external source. External devices/resources 68 may comprise any known type of external device, including speakers, a CRT, LED screen, hand-held device, keyboard, mouse, voice recognition system, speech output system, printer, monitor/display, facsimile, pager, etc. Bus 64 provides a communication link between each of the components in authentication server 44 and likewise may comprise any known type of transmission link, including electrical, optical, wireless, etc. Although not shown, additional components, such as cache memory, communication systems, system software, etc., may be incorporated into authentication server 44. It should be understood that authentication server 44 communicates with an electrical device over a power delivery network. These other items have not been shown in FIG. 8 for brevity purposes.

Shown loaded on authentication server 44 is calibration component 41, which includes database access system 72, time system 74, and usage system 76. As information pertaining to electrical device (or pertaining to its operation) is received on authentication server 44 over the power delivery network, database access system 72 will store the same in devices information database 46. Thereafter, this information will be used to determine whether the electrical device needs to be calibrated. Under the present invention, there are at least two ways in which this determination can be made. In a first embodiment, the determination is made based on whether a predetermined amount of time has elapsed since a previous calibration of the electrical device. To this extent, the present invention permits the storage of calendar information (date/time) pertaining to calibrations of electrical devices. Thus, when an electrical device is calibrated, the date and time at which the calibration occurred will be stored in devices information database 46.

Assuming that such information has been stored, database access system 72 will access devices information database 46 and retrieve the calendar information for a previous (i.e., the last) calibration of the electrical device. Based on this information, time system 74 will then determine whether a predetermined amount of time has elapsed since the previous calibration. To this extent, time system 74 can be pre-programmed with the predetermined amount of time. In any event, if the predetermined amount of time has elapsed, calibration of the electrical device can be requested. In addition, since the location of the electrical device can be stored in devices information database 46, a manual search for the electrical device need not be conducted. Rather, a technician or the like can be provided with specific location information. In any event, once calibration is performed, devices information database can be updated accordingly (e.g., by database access system 72).

Figure 9:
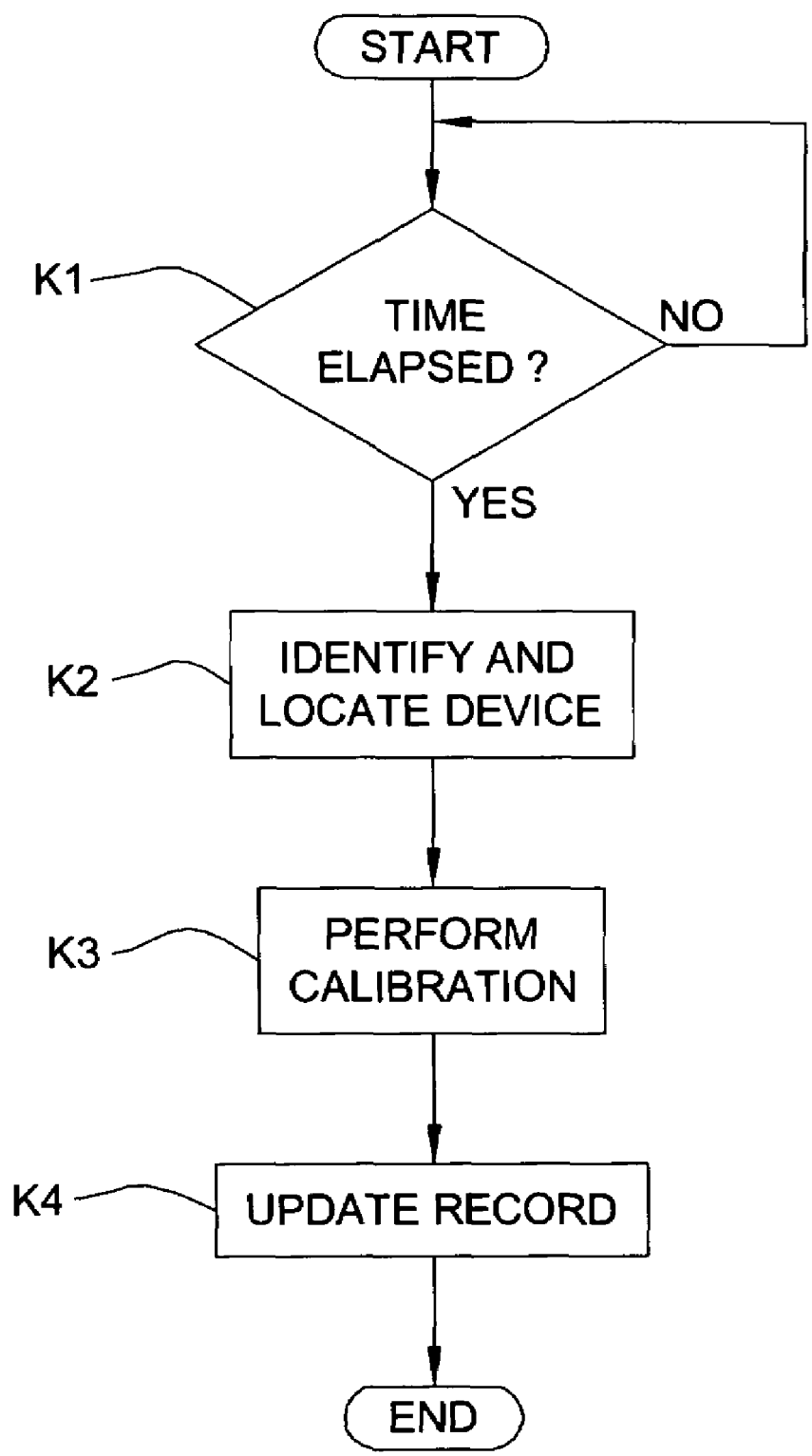
FIG. 9 depicts an operational flow diagram for making a time-based calibration determination for an electrical device according to the present invention.

Referring to FIG. 9, a flow diagram 100 depicting a time-based calibration determination according to the present invention is shown. In step K1, it is determined whether a predetermined amount of time has elapsed since a previous calibration of electrical device. If not, the process returns to start. However, if the predetermined amount of time has elapsed, the records of devices information database will be searched to determine the electrical device's identity and location in step K2. In step K3, the electrical device is calibrated, and in step K4, the corresponding record in the devices information database is updated.

As indicated above, the present invention also allows calibration determinations to be made based on usage of the electrical devices. Specifically, as shown in the above table(s) one piece of information that is tracked is the time in which an electrical device was enabled/energized (power-up) and then disabled/de-energized (powered down). Using these time coordinates, usage system 76 (FIG. 8) will first determine the usage of an electrical device during individual sessions. For example, if electrical device "A" was energized at 12:00 PM, and then de-energized at 12:30 PM, the usage for this session is 0.5 hours). Upon receiving a notice that a device was de-energized (e.g., from the authentication component, usage system 76 can make this computation. Then, usage system 76 will sum these individual session usage values to determine a cumulative usage of the electrical device. Once the cumulative usage is known, usage system 76 will determine whether the cumulative usage exceeds a predetermined threshold. If so, calibration of the electrical device can be requested. For example, usage system 76 can be pre-programmed with a predetermined threshold value of 5.0 hours. As such, whenever an electrical device's cumulative usage exceeds 5.0 hours, calibration of the electrical device can be requested. Similar to the time-based calibration determination, the identity and location of the electrical device can be retrieved from the corresponding record of the devices information database (FIG. 8). For those skilled in the art, it is apparent that information with respect to the usage of the device is known remotely from the device, and that this enables decisions with respect to calibration to be made remote from the device. Once calibration is performed, devices information database 46 can be updated accordingly (e.g., by database access system 72 of FIG. 8).

Figure 10:
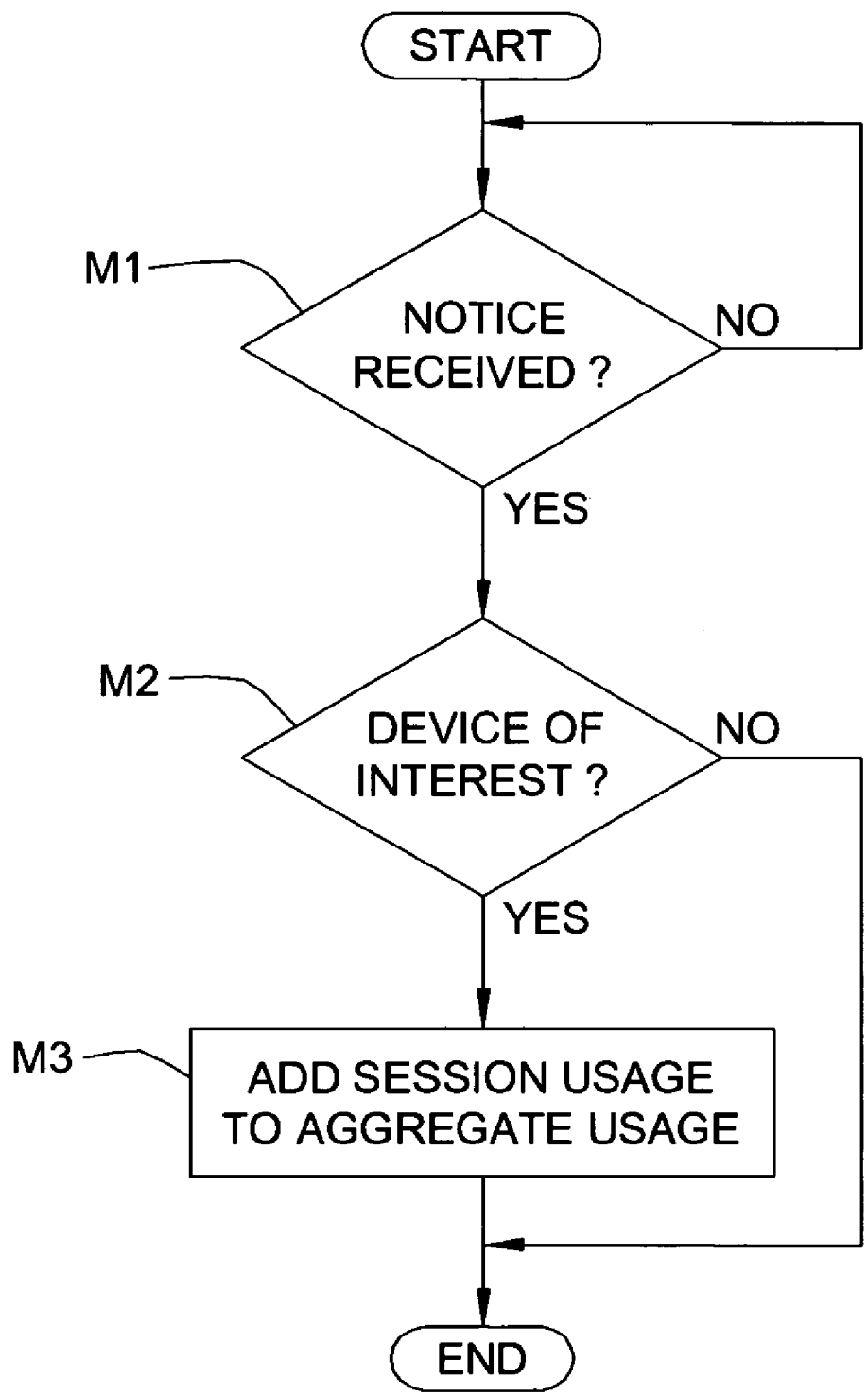
FIG. 10 depicts an operational flow diagram for computing a cumulative usage of an electrical device according to the present invention.

Referring to FIG. 10, a flow diagram 110 for computing a cumulative usage of an electrical device according to the present invention is shown. As depicted, in step M1, it is determined whether a notice was received that an electrical device was de-energized, which indicates that an individual session usage can be computed. If not, the process returns to start. However, if such a notice was received, it can be optionally determined in step M2, whether the device is a "device" of interest. Some devices may not require calibration or not be vital enough to perform calibration. Such an indication can be contained within devices information database 46. Thus, if the device is not of interest, the process can end. However, it the device is a device of interest, the individual session usage can be added to the running or aggregate usage value in step M3 to yield a cumulative usage.

Figure 11:
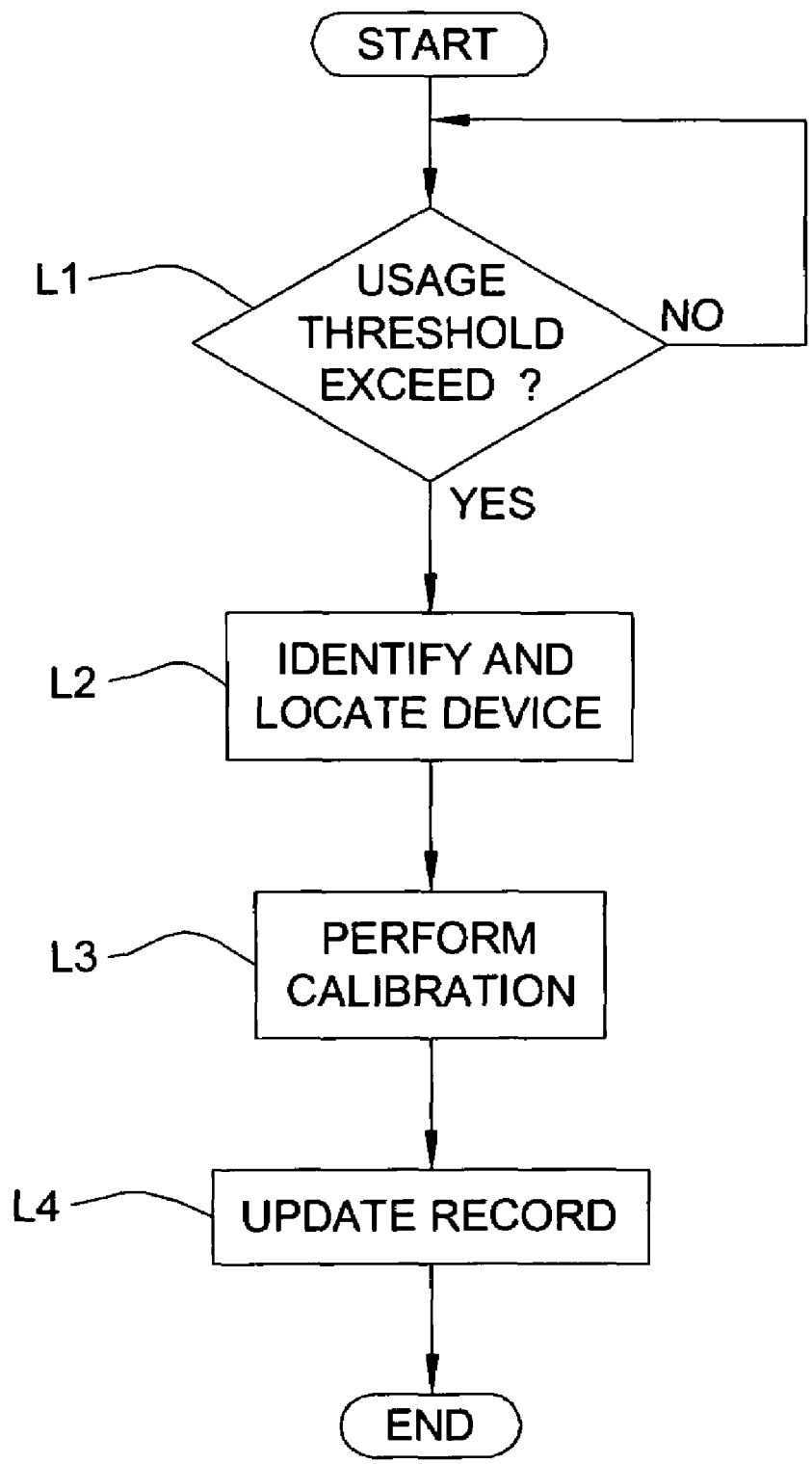
FIG. 11 depicts an operational flow diagram for making a usage-based calibration determination for an electrical device according to the present invention.

FIG. 11 depicts a flow diagram 120 for making a usage-based calibration decision of an electrical device according to the present invention. In step L1, it is determined whether the cumulative usage exceeds a predetermined threshold. If not, the process returns to start. However, if the cumulative usage does exceed the predetermined threshold, the identity and location of the electrical device are retrieved in step L2, and the device is calibrated in step L3. Then, in step L4, the corresponding record in devices information database 46 (FIG. 8) is updated to reflect the calibration.

It should be understood that the time based calibration determination and the usage-based calibration determination need not be mutually exclusive. That is, an electrical device could be calibrated both based upon calendar time and cumulative usage. Moreover, it should be understood that should calibration fail or not be performed, an electrical device could be taken out of service.

While shown and described herein as a method and system for calibrating an electrical device, it is understood that the invention further provides various alternative embodiments. For example, in one embodiment, the invention provides a computer-readable medium that includes computer program code to enable a computer infrastructure to make calibration determinations for electrical devices. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 62 (FIG. 8) and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to calibrate electrical devices as described above. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for calibrating electrical devices. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as authentication server 44 (FIG. 8), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or external I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for calibrating an electrical device, comprising:

connecting the electrical device to a power delivery network through a power socket via a power cord;

receiving on a remote server from the electrical device, via the power delivery network powering the electrical device, the following information:

identifying information that identifies the electrical device and provides a physical location of the electrical device, the providing of the physical location based on location information selected from the group consisting of: information from a global positioning device, information from triangulation methods based on known radio locations of the electrical device, and a user supplied location inputted on the electrical device;

activation information that indicates that the electrical device has been activated and determines a length of time that the device has been in use;

information indicative of an elapsed time since a last calibration of the electrical device; and deactivation information that indicates that the electrical device has been deactivated;

storing the received information in a devices information database;

determining whether the electrical device needs to be calibrated based on the information in the devices information database, including:

using the elapsed time since the last calibration of the electrical device to determine whether a predetermined amount of time has elapsed since a previous calibration of the electrical device, and using the activation information and deactivation information to calculate a cumulative usage of the electrical device and determining whether the cumulative usage exceeds a predetermined usage threshold;

in response to a determination that the electrical device should be calibrated, sending a request for calibration, the request for calibration including the identifying information and the physical location of the electrical device.

2. The method of claim 1, further comprising calibrating the electrical device if the predetermined amount of time has elapsed since the last calibration.

3. The method of claim 1, further comprising calibrating the electrical device if the cumulative usage exceeds the predetermined threshold of cumulative usage.

4. The method of claim 1, wherein the electrical device utilizes a data networking protocol, and wherein the data networking protocol comprises port-based access control.

5. The method of claim 1, wherein the remote server is an authentication server, wherein the authentication server receives the information indicative if usage or the elapsed time from an authentication component over the power delivery network, and wherein the receiving and determining steps are performed by the authentication server.

6. The method of claim 5, wherein the electrical device is connected to the power socket via a power bar.

7. A system for calibrating an electrical device, comprising:
  a power socket for connecting the electrical device to a power delivery network via a power cord;
  a database access system for obtaining information for the electrical device from a database, the information including:
    identifying information that identifies the electrical device and provides a physical location of the electrical device, the providing of the physical location based on location information selected from the group consisting of: information from a global positioning device, information from triangulation methods based on known radio locations of the electrical device, and a user supplied location inputted on the electrical device;
    activation information that indicates that the electrical device has been activated and determines a length of time that the device has been in use;
    information indicative of an elapsed time since a last calibration of the electrical device; and
    deactivation information that indicates that the electrical device has been deactivated;
  a time system for determining whether a predetermined amount of time has elapsed since a previous calibration of the electrical device based on the information;
  a usage system for computing a cumulative usage of the electrical device based on the information, and for determining whether the cumulative usage exceeds a predetermined threshold of cumulative usage; and
  means for, in response to a determination that the predetermined amount of time has elapsed since a previous calibration of the electrical device or that the cumulative usage exceeds the predetermined threshold of cumulative usage, sending a request for calibration, the request for calibration including the identifying information and the physical location of the electrical device.

8. The system of claim 7, wherein the database access system, the time system and the usage system are located on an authentication server with which the electrical device communicates over a power delivery network.

9. The system of claim 8, wherein the electrical device utilizes a data networking protocol.

10. The system of claim 9, wherein the electrical device connects to the power socket via a power bar.

11. The system of claim 9, wherein the data networking protocol comprises port-based access control.

12. The system of claim 9, wherein the wherein the database access system, the time system and the usage system are each implemented using technology selected from the group consisting of: hardware, software, or a combination of hardware and software.

13. A program product stored on a computer useable medium for calibrating an electrical device, the computer useable medium comprising program code for causing a computer to perform the following steps:
  connecting the electrical device to a power delivery network through a power socket via a power cord;
  obtaining information for the electrical device from a database, the information including:
    identifying information that identifies the electrical device and provides a physical location of the electrical device, the providing of the physical location based on location information selected from the group consisting of: information from a global positioning device, information from triangulation methods based on known radio locations of the electrical device, and a user supplied location inputted on the electrical device;
    activation information that indicates that the electrical device has been activated and determines a length of time that the device has been in use;
    information indicative of an elapsed time since a last calibration of the electrical device; and
    deactivation information that indicates that the electrical device has been deactivated;
  determining whether a predetermined amount of time has elapsed since a previous calibration of the electrical device based on the information;
  computing a cumulative usage of the electrical device based on the information, and determining whether the cumulative usage exceeds a predetermined threshold of cumulative usage; and
  in response to a determination that the predetermined amount of time has elapsed since a previous calibration of the electrical device or that the cumulative usage exceeds the predetermined threshold of cumulative usage, sending a request for calibration, the request for calibration including the identifying information and the physical location of the electrical device.

14. The program product of claim 13, wherein the program product is loaded on an authentication server with which the electrical device communicates over a power delivery network.

15. The program product of claim 14, wherein the electrical device utilizes a data networking protocol.

16. The program product of claim 15, wherein the electrical device connects to the power socket via a power bar.

17. The program product of claim 15, wherein the data networking protocol comprises port-based access control.

* * * * *